Figure 2:
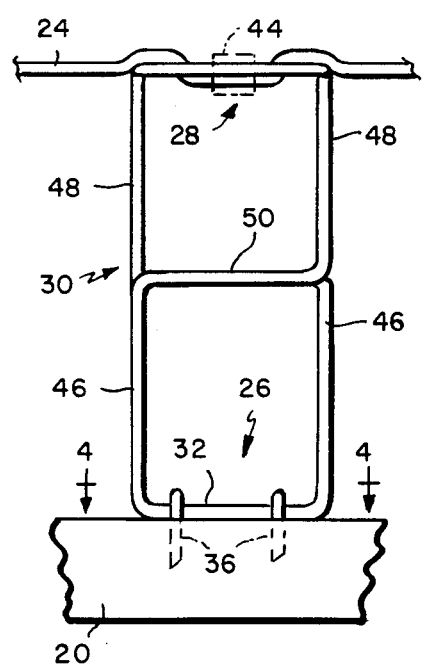

United States Patent [19]

Hagemeister

[11] Patent Number: 4,736,933
[45] Date of Patent: Apr. 12, 1988

[54] BENT WIRE SPRING MODULE

[75] Inventor: Robert C. Hagemeister, Boston, Mass.

[73] Assignee: Webster Spring Co. Inc., Oxford, Mass.

[21] Appl. No.: 31,161

[22] Filed: Mar. 25, 1987

Related U.S. Application Data

[63] Continuation of Ser. No. 829,490, Feb. 14, 1986, abandoned.

[51] Int. Cl.⁴ ............................ F16F 3/02; A47C 23/02
[52] U.S. Cl. ...................................... 267/103; 5/247; 5/255; 5/476; 267/107
[58] Field of Search .................. 267/85, 91, 103, 106, 267/107, 110, 109; 5/247, 267, 275, 255, 476

[56] References Cited

U.S. PATENT DOCUMENTS

| | | | |
|---|---|---|---|
| 2,849,057 | 8/1958 | Neely | 267/107 |
| 3,574,240 | 5/1971 | Slominski | 5/247 |
| 4,398,705 | 8/1983 | Mizelle | 267/103 X |
| 4,470,584 | 9/1984 | Mizelle | 267/103 |
| 4,475,724 | 10/1984 | Hancock | 267/103 |
| 4,577,841 | 3/1986 | Hagemeister | 267/103 |
| 4,666,136 | 5/1987 | Hagemeister | 267/103 |

Primary Examiner—George E. A. Halvosa
Attorney, Agent, or Firm—Robert T. Gammons

[57] ABSTRACT

A spring module for use in a spring assembly embodying a base frame and a grid frame comprising upper and lower attaching elements for connecting the module to the base frame and grid frame and a plurality of lower and upper symmetrically-disposed, yieldable legs connecting the lower and upper attaching elements.

4 Claims, 1 Drawing Sheet

U.S. Patent

Apr. 12, 1988

4,736,933

BENT WIRE SPRING MODULE

This is a continuation of co-pending application Ser. No. 829,490 filed on Feb. 14, 1986, now abandoned.

BACKGROUND OF THE INVENTION

Bent wire spring modules of various configurations are disclosed in my pending applications for patent Ser. No. 675,892, filed Nov. 28, 1984, now abandoned; Ser. No. 759,876, filed July 28, 1985, now U.S. Pat. No. 4,685,659; and Ser. No. 760,253, filed July 29, 1985, now U.S. Pat. No. 4,666,136, which variously provide for soft and stiff yield, for economizing in the use of wire, and for ease of manufacture. It is the purpose of this invention to provide modules of novel structural composition designed to afford the aforesaid advantage in a differently configured combination of supporting arms. More specifically, the structured module is designed to afford yield by torsion of the arms relative to each other.

SUMMARY OF INVENTION

As herein illustrated, the spring module comprises lower and upper attaching elements, by means of which the module can be attached, respectively, to a base frame and a grid frame and means yieldably connecting the lower and upper attaching elements comprising oppositely-inclined, upwardly-extending, transversely-spaced, parallel first legs, said first legs being connected at their lower ends to the lower attaching element, oppositely-inclined, downwardly-extending, transversely-spaced, parallel second legs, said second legs being connected at their upper ends to the upper attaching element, and transversely-spaced, parallel, horizontally-disposed third legs connecting the upper ends of the first legs to the lower ends of the second legs. The first legs are parallel to the second legs and the third legs are at right angles to the first and second legs. The attaching elements comprise spaced, parallel lengths of wire joined by diagonal lengths of wire, and the third legs are parallel to the spaced, parallel lengths of wire of the attaching elements and are located at a spacing less than the spacing between the parallel lengths of wire of the attaching elements. The diagonally-disposed lengths of wire are disposed in opposite directions, the first and second wires are of the same length and the third lengths of wire are of the same length.

Figure 1:
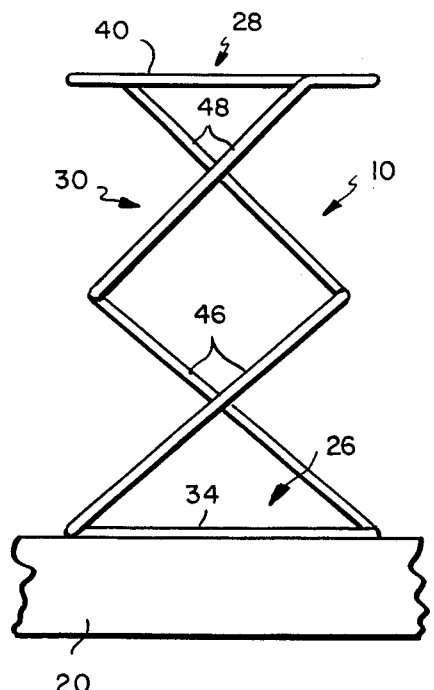
Figure 3:
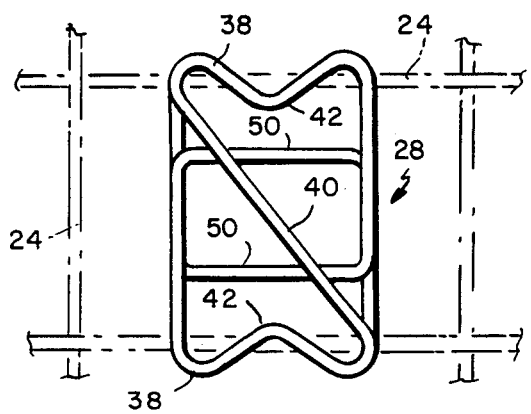
Figure 4:
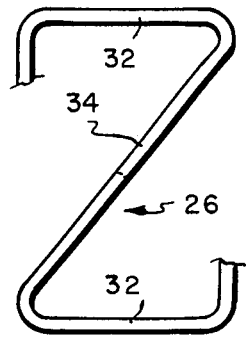
Figure 5:
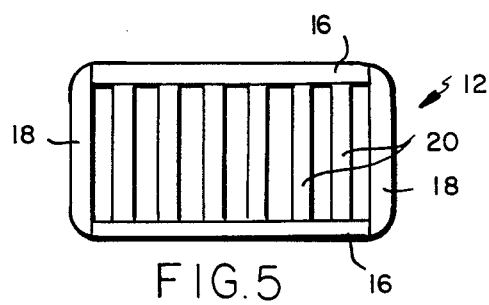
Figure 6:
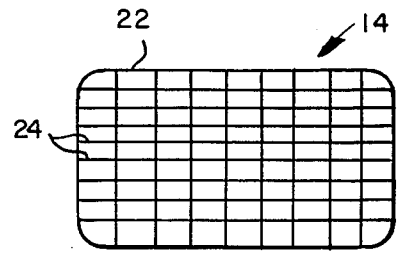

The invention will now be described in greater detail with reference to the accompanying drawings, wherein:

FIG. 1 is a front elevation of the spring unit;
FIG. 2 is a side elevation of the spring unit;
FIG. 3 is a top elevation of the spring unit;
FIG. 4 is a bottom view of the spring unit.
FIG. 5 is a plan view of a base frame to which the lower ends of the spring units are attached; and
FIG. 6 is a plan view of a grid frame to which the upper end of the spring units are attached.

Referring to the drawings, the spring unit 10 is of bent wire construction and in accordance with the invention, a plurality of these spring units are disposed between a base frame 12 and a grid frame 14 in transversely and longitudinally-spaced relation to each other. The base frame 12, FIG. 5, comprises spaced, parallel sides 16—16, spaced, parallel ends 18—18 and between the sides there are transversely-disposed, longitudinally-spaced cross bars 20—20. The grid frame 14, FIG. 6, comprises a rectangular border wire 22 and transversely and longitudinally-extending crossing grid wires 24 welded at their crossings.

The bent wire spring modules 10 are disposed with their lower ends resting on the cross bars 24 of the base frame 12 and their upper ends abutting the underside of the grid wires 24 of the grid frame 14. Each bent wire module has a lower attaching element 26 and an upper attaching element 28 and intermediate the lower and upper attaching elements, a system of yieldable legs 30.

The lower attaching element 26 comprises spaced, parallel lengths of wire 32—32 joined by a diagonal 34. The lower attaching element 26 is attached to a bar 20 by staples 36. The upper attaching element 28 comprises spaced, parallel lengths of wire 38—38 connected by a diagonal 40. The lengths of wire 38—38 contain deviations 42—42 for receiving clips 44—44 by means of which they are attached to the grid wires 24.

In accordance with the invention, the intervening yieldable legs 30 comprise first legs 46—46 connected at their lower ends to the wires 32—32 of the lower attaching element 26 which extend upwardly in opposite directions from opposite ends of the wires 32—32 in spaced, parallel planes and second legs 48—48 connected at their upper ends to the 38—38 of the upper attaching elements 28 and extend downwardly therefrom in opposite directions in spaced, parallel planes and third legs 50—50 disposed transversely of the module in spaced, parallel relation midway between the upper and lower attaching elements and parallel to the lengths of wire 32—32 and 38—38 connected at their opposite ends to the upper and lower ends of the lower and upper ends of the lower and upper legs.

As herein illustrated, the lower and upper legs are parallel to each other and the are of the same length.

The modules are attached to the base frame 16 by means of the staples 36 and to the grid frame 14 by means of the clips 44.

It should be understood that the present disclosure is for the purpose of illustration only and includes all modifications or improvements which fall within the scope of the appended claims.

What is claimed is:

1. A spring module comprising lower and upper attaching structures, each structure comprising spaced, parallel, straight lengths of wire for attachment to a base frame and correspondingly spaced bent lengths of wire for attachment to a grid frame, a first diagonal length of wire disposed in the plane of the spaced, parallel, straight lengths of wire, said first diagonal length of wire having opposite ends connected to, respectively, the opposite ends of the spaced, parallel, straight lengths of wire, a second diagonal length of wire disposed in the plane of the spaced, bent lengths of wire, said second diagonal lengths of wire having opposite ends connected to, respectively, the opposite ends of the spaced, bent lengths of wire, said first and second diagonal lengths of wire extending diagonally in the planes of the straight lengths of wire and the bent lengths of wire in opposite directions and means yieldably connecting the upper and lower attaching structures comprising oppositely-inclined, upwardly-extending, transversely-spaced first legs situated in spaced, parallel, vertical planes, said first legs being connected at their lower ends to the ends of the parallel lengths of wire opposite the ends connected to the diagonal lengths of wire, oppositely-inclined, downwardly-extending, transversely-spaced second legs situated in spaced, parallel, vertical planes, said second legs being connected at their upper ends to the ends of said bent lengths of wire, horizontally-disposed, transversely-spaced, parallel, in the same plane, symmetrically disposed with respect to the lower and upper attaching structures, third lengths of wire situated in a horizontal plane parallel to the planes of the upper and lower attaching elements and at right angles to the vertical planes of said first and second legs, said third lengths of wire connecting the upper ends of the first legs with the lower ends of the second legs.

2. A spring module according to claim 1 wherein the first legs are parallel to said second legs and inclined in the same direction.

3. A spring module according to claim 1 wherein the third legs are at right angles to the fist and second legs.

4. A spring module according to claim 1 wherein the first and second legs are of substantially the same length and the third legs are of substantially the same length.

* * * * *